March 7, 1950     W. B. WIEGAND ET AL     2,499,438
MANUFACTURE OF CARBON BLACK
Filed Sept. 12, 1944     2 Sheets-Sheet 1
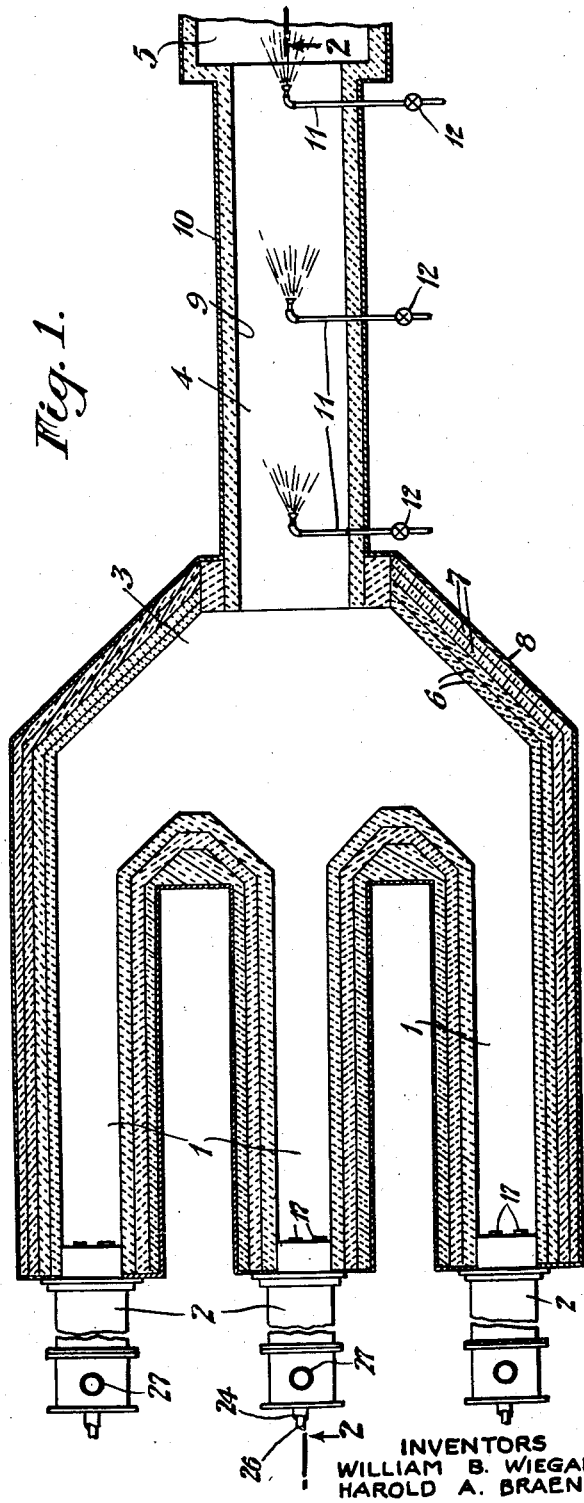
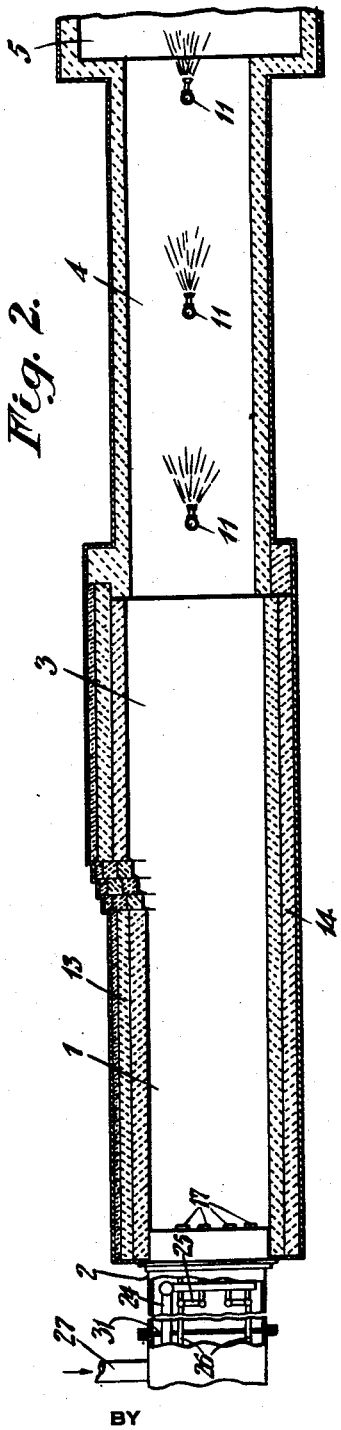
INVENTORS
WILLIAM B. WIEGAND
HAROLD A. BRAENDLE
BY Pennie, Davis, Marvin & Edmonds
ATTORNEYS March 7, 1950 W. B. WIEGAND ET AL 2,499,438
MANUFACTURE OF CARBON BLACK
Filed Sept. 12, 1944 2 Sheets-Sheet 2
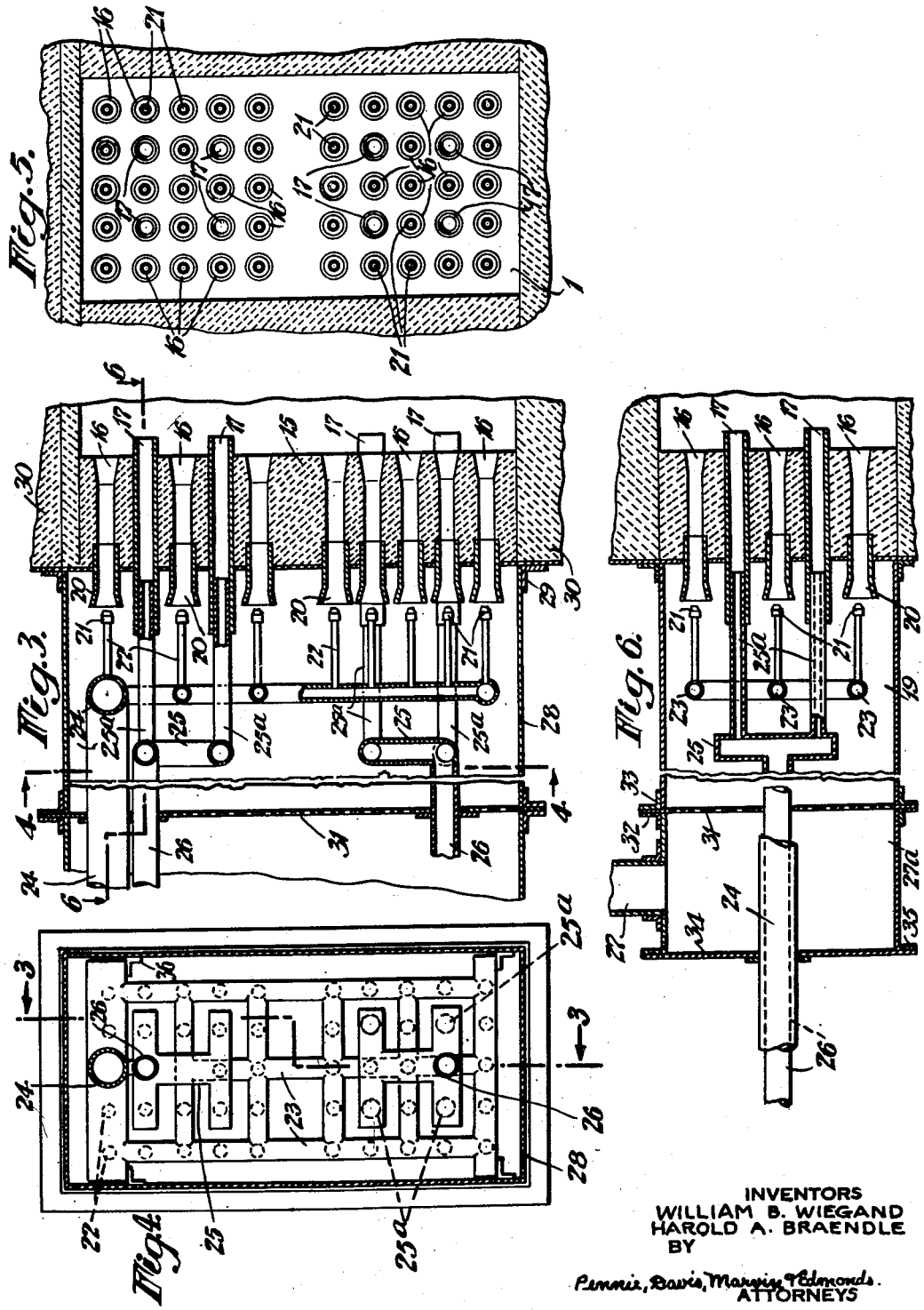
INVENTORS
WILLIAM B. WIEGAND
HAROLD A. BRAENDLE
BY
Pennie, Davis, Marvin & Edmonds.
ATTORNEYS Patented Mar. 7, 1950

2,499,438

UNITED STATES PATENT OFFICE 2,499,438

MANUFACTURE OF CARBON BLACK

William B. Wiegand, Old Greenwich, Conn., and Harold A. Braendle, Garden City, N. Y., assignors to Columbian Carbon Company, New York, N. Y., a corporation of Delaware Application September 12, 1944, Serial No. 553,781

6 Claims. (Cl. 23—209.8)

This invention relates to the manufacture of carbon black and more particularly to an improved process whereby carbon blacks embodying novel combinations of characteristics, including fineness of subdivision, a high degree of purity and peculiar combinations of characteristics, particularly desirable in the compounding of certain rubber compositions, may be produced.

Carbon blacks are widely used in various industries, for instance, as pigments in inks, paints, lacquers and the like, and as reinforcing agents in various rubber compounds. They vary widely as to fineness of subdivision, purity and other properties and as to their combination of various characteristics, particularly the ease with which they may be incorporated in rubber compositions, their influence upon the characteristics of the rubber composition and their behavior toward accelerators and other agents used in rubber compounding.

The desirability of certain particular characteristics and combinations of various characteristics in a carbon black to be used in the compounding of rubber depends largely upon the type of rubber compound to be produced and the particular properties desired to be embodied in the rubber article to be fabricated therefrom. It has generally been extremely difficult, and in most cases impossible, to produce a carbon black which is not seriously deficient as to one or more desired properties.

In our copending application Serial No. 553,782, filed September 12, 1944, there is described and claimed a carbon black possessing a novel combination of characteristics by reason of which it is particularly suitable for certain purposes, including the manufacture of synthetic rubber goods. The process of the present invention is of particular utility in the production of a carbon black particularly suitable for the reinforcement of the synthetic rubber known as GR-S, as described in our said copending application. However, the process is also useful in the production of other carbon black products.

The carbon black described in said copending application is characterized by a moderate fineness of subdivision, unique oil absorption characteristics, a high degree of purity, a non-acidic reaction, good workability or ease and economy of processing in the compounding of rubber, ink or the like, and a unique combination of properties by reason of which it is of particular value in the compounding of synthetic rubber. As a rubber-compounding agent, this carbon black is further characterized by non-interference with vulcanization and by imparting to natural or synthetic rubber compositions in which it is used, high modulus, high rebound, superior flex resistance, low hysteresis, and good heat stability and aging properties. Said carbon black product has been found particularly desirable in the compounding of synthetic rubber of the GR-S type where processing is unusually difficult and where deformation and heat build-up in the rubber product are particularly severe, as more fully described in said copending application. Rubber, and particularly GR-S, compounded with this carbon black has also been found markedly improved as to cut growth resistance of the composition. The individual characteristics and combination of characteristics of the carbon black product may, by the present process, be varied considerably by varying operating conditions, as hereinafter more fully described.

In our Patent #2,378,055, issued June 12, 1945, there is described a process for the production of carbon black whereby a hydrocarbon gas, herein designated "make gas," is forcefully injected into a confined stream of violently turbulent blast flame gases, in such a way as to effect rapid and thorough mixing of the make gas with the flame gases, and the mixture caused to continue on through an elongated, confined passageway at a high temperature and at high velocity and turbulence. The make gas is thus decomposed by heat absorption directly from the flame gases, and the carbon black thus formed is carried along through and out of the reaction zone by the high velocity gas stream, cooled to a suitable collection temperature and recovered in any customary manner.

The present invention comprises a particularly desirable modification of the process there described by which we have been able to produce carbon blacks of particularly desirable characteristics in high yields of uniform quality and with a minimum of operating difficulties frequently encountered in the production of carbon black.

In general, the process of the present invention comprises blasting a combustible mixture of a fuel gas and an oxygen-containing gas into one end of an elongated, unobstructed chamber, burning the combustible gas mixture in said chamber to form a violently turbulent blast flame therein, decomposing a hydrocarbon gas, herein designated "make gas," by forcefully injecting said gas as a stream or streams into the violently turbulent blast flame gases in a direction substantially parallel to the longitudinal axis of said chamber and concurrent with the flow of the flame gases, the make gas becoming thoroughly mixed with the highly turbulent flame gases and absorbing heat therefrom while the mixture in a state of high turbulence proceeds through the said elongated chamber.

For convenient reference, the combustible gas supplied in admixture with the oxygen-containing gas to support the blast flame is herein designated "fuel gas," and the stream of hydrocarbon gas to be decomposed by injection into the blast flame gases is herein designated "make gas."

The fuel gas may, for instance, be natural gas consisting primarily of methane and of normal B. t. u. value, though other hydrocarbon gases may be used. The make gas may likewise consist primarily of methane but may, with advantage, contain in addition to methane, a substantial proportion of more complex hydrocarbons, i. e., hydrocarbons containing in excess of 1 carbon atom per molecule.

It appears that by thus injecting the make gas into the blast flame gases, the stream or streams of make gas remain in contact with the blast flame gases substantially undispersed therein for a brief interval sufficient to effect partial pyrolysis of the make gas in a relatively concentrated form, i. e., without substantial dilution of the make gas with the flame gases, but immediately following this brief interval, during which partial pyrolysis is effected, the make gas becomes intimately dispersed in the blast flame gases before the reaction has been permitted to proceed to completion.

The blast flame may be produced by combustion of a mixture of a fuel gas, natural gas, for instance, and an oxygen-containing gas, air, for instance, in which the proportion of air or oxygen is substantially in excess of that required for the complete combustion of the fuel gas, while blasting the combustible mixture into an elongated, unobstructed chamber at an exceedingly high velocity. The character of the flame has been found materially to influence the characteristics of the carbon black product. Therefore, we have found it desirable carefully to control the blast nozzle velocity of the blast gas and the proportion of air or oxygen therein. The combustible blast mixture may be pre-mixed or may be admixed at the burner nozzle.

Instead of an oxidizing blast a so-called neutral or a so-called reducing blast may be used and may be produced by reducing the proportion of air to the amount or below the amount required for the complete combustion of the fuel gas.

According to a particularly desired aspect of the invention, the proportion of air in the blast flame should exceed that required for complete combustion, usually by at least 10% and, advantageously may be 25%, or more, in excess of that theoretically required for complete combustion of the fuel gas. However, the proportion of air should be less than that required for the combustion of the total hydrocarbon gas, i. e., the fuel gas, plus the make gas.

It has also been found particularly desirable to use as the make gas, a hydrocarbon gas, consisting principally of methane, but containing substantial amounts of more complex hydrocarbons. The use of enriched natural gas in the production of carbon black by other methods has previously been proposed. However, we have found the use of such enriched make gas to be peculiarly applicable to our present process.

While we do not predicate our invention, or any aspect thereof upon any theory as to its operation, it is our present belief that the more complex hydrocarbons present in the make gas, being more reactive than the methane constituent, are more susceptible to a partial pyrolysis, perhaps some selective pyrolysis, during the brief interval prior to intimate dispersion in the blast flame gases, which influences the nature of the product.

Regardless of theory, we have found that by the concurrent use of an oxidizing blast, such as just described, and of a make gas consisting principally of natural gas, and enriched by addition thereto of more complex hydrocarbon to a B. t. u. value of at least 1150 and preferably about 1500–1600 B. t. u. per cubic foot, the novel product of our previously referred co-pending application Serial No. 553,782, may be obtained.

Unlike previously proposed processes for the production of carbon black involving the admixing of a hydrocarbon gas with hot combustion products, according to our present process, the make gas is injected into highly turbulent blast flame gases and the mixture is maintained in a highly turbulent condition at a temperature sufficiently high to decompose the make gas for an extended period of time as the mixture proceeds at high velocity through the unobstructed elongated chamber, as hereinafter more fully described. It is desirable that the elongated chamber be of substantially uniform cross-section for a distance sufficient to provide the required time factor under the high velocity, highly turbulent condition, and that the turbulent gas stream not be subjected to abrupt changes in the direction of flow.

A highly turbulent, blast flame suitable for the purpose of the present invention may be produced by burning the blast gas mixture under conditions of unusually high blast flame velocities, i. e., blast port velocities in excess of about 35 feet per second and preferably about 80 feet to 85 feet per second, as determined at 60° F. and 30 inches of mercury. Blast port velocities within the range of about 55 feet to 135 feet per second, which is in excess of velocities normally encountered in blast burner operations, may be used with particular advantage. The optimum burner port velocity will vary somewhat with the port size but must be sufficient to produce a violently turbulent blast flame.

Advantageously, in that aspect of the process in which an oxidizing blast and enriched make gas are employed, the temperature of the blast flame gases at the point of injection of the make gas should not exceed about 2600° F. In other operations higher temperatures may be employed with advantage. The temperature at the point of make gas entry is not necessarily the maximum temperature attained in the operation, as combustion continues beyond such point for a distance depending upon the particular operating conditions. The blast flame gas temperature at the point of make gas entry should be sufficiently high to effect active decomposition of the make gas.

To make gas, as previously noted, may, with advantage, consist of natural gas enriched with higher hydrocarbon, for instance ethane, propanes, natural gasoline, or heavier oil, and heated to well above the dew point of the enriching hydrocarbon. In preparing the make gas, natural gas, for instance, is preheated and enriched with higher hydrocarbons such as previously noted to a B. t. u. value above about 1150 B. t. u. per cubic foot, and preferably to about 1500–1600 B. t. u. per cubic foot. The mixture is then superheated so as to retain all hydrocarbons of the mixture in a vaporous or gaseous state. Super-heating to a temperature of about 500° F. has usually been found adequate though higher temperatures may be employed. However, it has not generally been found advantageous to pass the make gas to the injection tubes at a temperature above about 800° F., as at such temperatures the gaseous mixture has been found to have a tendency to deposit carbon or coke in the make gas feed tubes.

Where it is desired to produce a carbon black of particularly high modulus characteristics, it is recommended that the B. t. u. value of the make gas be kept above 1200 and preferably about 1500 to 2000 B. t. u. per cubic foot. By such enrichment with an oil having an end point below about 800° F., high yields of high modulus carbon black may be produced. Particularly desirable products have been obtained in commercial operations using a make gas enriched to 1650 B. t. u. per cubic foot by use of an oil of the general type employed as Diesel fuel. However, increasing the enrichment of the make gas appreciably above 2000 B. t. u. per cubic foot has generally been found to result in a black of low tensile properties and of inferior quality. Enrichment within the indicated range has been found to result in increased yield and improved modulus. Straight natural gas may be used, unenriched, as the make gas when it is desired to make a product of finer particle size and with more nearly normal modulus properties.

Increased yields of from 100% to over 500%, as compared to yields normally obtained using unenriched natural gas, may thus be obtained by enrichment.

The B. t. u. values herein referred to are the values of the gross heat of combustion per cubic foot of gas, said volume being calculated to standard conditions of 60° F. and 30 inches of mercury (saturated gas).

Hydrocarbons such as petroleum oils, refinery waste gases and the like may be used for enrichment of the make gas. Though relatively inexpensive, these higher hydrocarbons are considerably more expensive than natural gas. An advantage of the present invention is that heat for effecting the decomposition of the make gas may be supplied, at least to a major extent, by the burning of a less expensive fuel such as natural gas and a minimum of the more costly, higher hydrocarbons, is consumed by combustion.

We are unable at present to state with certainty the precise nature and composition of the blast flame gases at the zone of introduction of the make gas, or to account for their peculiar effect on the nature of the carbon black product. We can, however, state with certainty that at the zone of introduction of the make gas, the flame is violently turbulent and in an ionized, highly active condition. It is probable that the flame gases at this zone contain considerable amounts of partially oxidized hydrocarbons, such as aldehydes and similar materials. Because of the high temperature and unstable condition of the flame gases, accurate analysis is extremely difficult, if not impossible. That combustion of the fuel gas is continuing at the zone of introduction of the make gas is indicated by the observation that, generally, even when no make gas is being introduced, the maximum temperature of the blast gases within the chamber is attained at a point down-stream from the zone of make gas entry. Means of attaining the desired results are herein disclosed and an accurate understanding of the theory involved is not essential to the attainment of such results.

The process will be further described with reference to the accompanying drawings which illustrate a type of apparatus particularly adapted to the carrying out of the process, and which is the subject of our copending application Serial No. 553,780, filed September 12, 1944.

Fig. 1 of the accompanying drawings is a horizontal sectional view of the apparatus;

Fig. 2 is a vertical, longitudinal sectional view along the line 2—2;

Fig. 3 is an enlarged longitudinal sectional view of the burner assembly along the broken line 3—3 of Fig. 4;

Fig. 4 is an enlarged transverse sectional view of the burner assembly along the line 4—4 of Fig. 3;

Fig. 5 is an end view of the burner assembly shown in Fig. 3; and

Fig. 6 is a horizontal sectional view of Fig. 3 along the line 6—6.

The apparatus specifically illustrated in the drawings comprises three reaction chambers combined in a single unit. However, it will be understood that where desirable, the unit may comprise a single reaction chamber or entirely separate and independent reaction chambers may be employed. It is not essential that the reaction chambers be of rectangular cross-section, as shown in the drawings. Reaction chambers of cylindrical shape, for instance, may be employed.

With particular reference to Figs. 1 and 2 of the drawings, three parallel reaction chambers 1, of rectangular cross section are shown. Burner and make gas injection assemblies 2 are secured to the entrance end of the respective reaction chambers. At their exit ends, the reaction chambers communicate with a, so-called, blending chamber 3. The effluent from chamber 3 passes to and through the flume 4 and thence to a pre-cooler indicated at 5. The chambers 1 and 3 are lined with fire brick and are well insulated against loss of heat. More specifically the outer vertical walls of the outer reaction chambers 1 and of the blending chamber 3 are constructed of two 4½" thicknesses of fire brick 6 covered by two 4½" thicknesses of heat insulating material 7, all enclosed in a sheet metal casing 8. The inner vertical walls of the two outer reaction chambers 1 and both vertical walls of the inner reaction chamber 1 are similarly constructed except for the omission of one of the layers of insulation.

The flume 4 is of cylindrical cross-section and is constructed of a single thickness of fire brick 9 4½" in thickness enclosed in a sheet metal casing 10, and is otherwise uninsulated against loss of heat. The pre-cooler diagrammatically represented at 5, may be of any conventional design and leads to conventional cooling and collecting equipment, not shown in the drawings.

The flume 4 is equipped with a series of water-sprays conveniently spaced along the length of the flume, as indicated at 11. These water sprays are connected in conventional manner with a suitable source of water, the connections being provided with separate control valves as indicated at 12. The water sprays should be so positioned and used in such a way as to provide effective control of the time factor, and adequate flexibility to meet varied operating conditions as hereinafter more fully described.

The roof 13 and floor 14 of the chambers 1 and 3 are constructed of 12" thicknesses of fire brick. The roof is suspended in a conventional manner and is covered with a 1" thickness of heat insulating material surmounted by a sheet metal casing.

The burner assemblies 2, as more clearly shown in Figs. 3 to 6, inclusive, of the drawings comprise a refractory burner block 15 adapted to fit into the entrance to chamber 1 and having burner ports 16 extending therethrough, the ports being flared at their forward ends. Intermediate the ports 16 the burner block is provided with ports extending therethrough in a direction substantially parallel to the axis of the respective burner ports and adapted to receive make gas injection tubes 17 of refractory material and to permit tubes 17 to be moved backwards or forwards through the port as subsequently described. Tubes 17, as shown, project a substantial distance to the rear of the burner block, extending through openings in metal plate 18 into the wind box 19.

Tubes 20 of metal, flared at their rearward end, also extend through openings in plate 18, to which they are securely fastened as by welding, and are positioned and supported by the plate. The forward ends of the tubes 20 project into the blast ports 16 and advantageously are cemented to the ports to secure a tight fit. Centrally positioned at the entrance of each of the tubes 20 is a fuel nozzle 21 connected by tube 22 to the fuel gas manifold 23 to which fuel gas is supplied under pressure through pipe 24 from any convenient source.

The make gas injection tubes 17 are connected with the make gas manifolds 25 by means of metal tubes 25A which are secured to the rearward ends of the refractory tubes 17, as by cementing. Make gas is supplied to manifolds 25 from a suitable source, not shown, through tubes 26.

Air for admixing with the fuel gas to form the combustible mixture is supplied under pressure to the wind box 19 from any convenient source through air duct 27 and air chamber 27a. The side walls 28 of the wind box are of impervious sheet metal and are secured to flange 29 by conventional means, for instance, by welding or by riveting. The flange 29 is in turn fastened to plate 18, advantageously by bolting or the like, so as to provide ready access to the interior of the wind box and the elements therein, for purposes of cleaning, repair, and replacement. By like means, the flange 29 and plates 18 are removably fastened to the rearward walls 30 of the respective reaction chambers.

So as to insure uniform distribution of the incoming air to the respective burner ports, the air entering the wind box is, with advantage, caused to pass through perforations of the perforated metal plate 31, held in position between the flanges 32 and 33 secured to the air chamber 27a and the walls 28 of the wind box, respectively, and by means of which the two are joined as by bolts. In lieu of the perforated plate 31, or as a supplement thereto, even distribution of air to the respective burner ports may be assured by longitudinally extending the wind box as indicated in Figs. 3 and 6 of the drawings.

Also, as shown more clearly in Figs. 3 and 6, the air chamber 27a is, with advantage, enlarged to the transverse dimensions of the wind box and the rear end of this chamber 27a sealed by a removable plate 34 held in place as by flanges 35. The plate 34 is provided with openings adapted to permit the passage therethrough of fuel gas conduit 24 and make gas conduits 26.

As shown particularly in Fig. 4 of the drawings, the fuel gas manifold 23 is supported by brackets 36 and is adapted to be moved longitudinally so as to adjust the position of nozzles 21 with respect to the entrance ends of tube 20. The make gas manifolds 25 are supported by the conduits 26 and the plates 31 and 34, and are likewise adapted to longitudinal movement whereby the position of the exit end of tubes 17 may be adjusted with respect to the face of the burner block.

As appears more clearly from Fig. 5 of the drawings, each of the make gas injection tubes 17 is flanked on all sides by blast ports 16.

In carrying out the process of our present invention, the fuel gas under pressure of about 10 lbs. per square inch is supplied through line 24, header 23 and connections 22 to the nozzles 21, and is jetted thereby into and through the burner port 16. Air for combustion is supplied under pressure through conduit 27 and air chamber 27a to the wind box 19 and passes at high velocity through the burner port 16. In passing through the burner ports, the air and fuel gas are intimately and uniformly admixed. The air and fuel gas thus supplied are so proportioned that the combustible mixture issuing from the burner ports contains oxygen and fuel gas in the desired proportions, as previously described.

The combustible mixture is ignited at the exit of the burner ports to form a violently turbulent blast flame. In order to produce a blast flame of the violent turbulence required, it is necessary that the combustible mixture be blasted through and from the burner ports at an unusually high velocity of the order previously noted.

The throat of the blast ports should not exceed about 2" to 2½" in diameter. Diameters greater than 2½" have generally been found undesirable. Burner blocks so designed as to create a zone of eddy currents at the periphery of each blast port exit appear to assist in maintaining ignition of the blast gases at the port exit, to permit maximum blast velocities and to assist in maintaining maximum rate of combustion and uniform flame development across the transverse section of the furnace. A substantial area of relatively flat surface at the burner block face appears to assist in establishing and maintaining such a zone of eddy currents.

The total area of the burner ports should be so related to the transverse sectional area of the reaction chamber 1, as to maintain adequate velocity and turbulence of the resultant gaseous mixture passing through the chamber at the prescribed fuel injection velocity, as hereinafter more fully described.

Make gas of the nature previously described, and preheated above the dew point of the more complex hydrocarbons, when enriched therewith, is supplied through lines 26, headers 25 and connection 25a to the make gas injection tubes 17, and is injected at high velocity, as previously described, into the violently turbulent blast flame gases. As previously noted, the structure of the make gas streams appears to persist for a brief period and then rapidly becomes intimately admixed with the blast flame gases. The mixture continues at high velocity and high turbulence through the chamber 1 and from thence passes into the blending chamber 3, wherein the gaseous mixtures from the respective reaction chambers become admixed. Advantageously, the transverse sectional area of blending chamber 3 is greater than the summation of the transverse areas of the chamber 1, so as to provide additional time factor at the elevated temperature. The cost of construction may be materially reduced by providing an enlarged blending chamber of the type shown, but its use is not an essential feature of the present invention.

It is important that the gaseous mixture resulting from the injection of the make gas into the blast flame gases be maintained in a state of violent turbulence for an extended period of time. During this period of violent turbulence, the mixture must be maintained at a temperature at which active decomposition of make gas will occur. Such a temperature should also be maintained for a period of time following the necessary period of violent turbulence but during this subsequent period it is not essential that the violent turbulent condition be maintained. Accordingly, it is permissible to reduce the velocity of the gaseous mixture and suspended carbon by passing it through a so-called blending chamber of increased transverse sectional area to provide the necessary time factor at the required temperature.

Leaving the blending chamber, the gaseous mixture passes through the flume 4 in which there is some loss of heat from the mixture through the substantially uninsulated walls thereof, and in which the reaction-time factor may be suddenly terminated by cooling the mixture to below the reaction temperature, as by spraying with water. Advantageously, the flume is substantially smaller in transverse sectional area than the blending chamber so as to provide more accurate control of the duration of the period during which the gas and suspended carbon mixture is maintained at a reaction temperature. By means of water sprays spaced along the flume, the time-factor may be adjusted by the selective use of a water spray so positioned in the flume as to provide the optimum time factor before contact of the hot mixture with the water spray.

One or more water sprays in flume 4 may be used as required to accommodate the apparatus to varying load capacities. Only three water sprays are shown in the drawings. However, it will be understood that additional sprays spaced at a point intermediate those shown may be used to effect more accurate control of the time factor.

As previously noted, the hot mixture passes from the flume into a pre-cooler indicated at 5, which may be of any conventional design, and from thence passes to a cooling and collecting system, which may also be of any conventional design.

The velocity at which the make gas is injected into the blast flame gases is subject to variation, depending upon other operating conditions. In general, in normal operation, the velocity of make gas injection advantageously exceeds that of the blast flame gases by an amount sufficient to overcome the turbulent eddy currents of the surrounding blast flame gases. The optimum make gas injection velocity will depend primarily upon other operating conditions, including the velocity of the blast flame gases, the point of injection into the blast flame gases, the temperature of the blast flame gases at the point of injection, richness of the make gas, amount of pre-heating of the make gas, general furnace design, and special characteristics of the product desired. The extent of the partial pyrolysis of the make gas prior to intimate admixture with the flame gases, other conditions being equal, will be materially influenced by the amount by which the velocity of make gas injection exceeds the velocity of the blast flame gases. In general, the make gas injection velocity should be within the range of 40 feet to 150 feet per second, as determined from volumes calculated at 60° F. and 30 inches of mercury.

The point of injection of the make gas into the flame gases may be readily controlled and regulated in the apparatus shown by adjusting the position of the exit end of the tube 17 with respect to the face of the burner block 15. In normal operation, it is usually desirable that tubes 17 project at least about 1 inch but not exceeding 12 inches beyond the face of the burner block. However, the exit ends of tubes 17 may, with advantage, under some operating conditions, be positioned flush with the face of the burner block, or even slightly recessed. Both quality of the product and yield may be materially affected by variations in the position of the exit of these tubes with respect to the face of the burner block. The make gas injection tubes are preferably composed of a heat conducting refractory, so that the incoming make gas may be further preheated to a temperature at which pyrolysis is initiated by radiant energy from the reaction chamber prior to injection into the blast flame gases. The amount of preheating may, in general, be increased by increasing the projection of the make gas tubes into the reaction chamber. However, extension of these tubes beyond about 12 inches has generally been found to result in coking of the tubes due to decomposition of the make gas.

The point of make gas injection should be completely surrounded by blast flames. This is accomplished in the apparatus illustrated by surrounding the tubes 17 by burner ports 16, so that the entire assembly forms a uniform pattern.

One feature of the described arrangement of blast and make gas entry is that through this means, wide variation in load is possible without necessitating substantial readjustment of other operating conditions, since a change in load involves a direct change in velocities and thus the rapidity of uniform distribution of the make gas in the blast flame gases is substantially unchanged. Thus this method of make gas injection, has, in some instances, a definite advantage over the injection of the make gas into the blast flame at a substantial angle from the direction of flow of the blast gases.

Subsequent to the discharge of the make gas into the blast flame gases, the two become intimately admixed and flow through the elongated unobstructed chamber of substantially uniform cross-section, such as the reaction chamber 1 of the drawings, for a substantial distance before any change in the flow pattern of the mixture is permitted. During this period a state of violent turbulence results from the high velocity at which the gases are passed through the chamber. In order to attain the required degree of turbulence, it is necessary that the velocity of the mixture through the chamber be in excess of about 30 feet per second.

We have obtained satisfactory turbulence in commercial sized units at velocities of about 35 to 100 feet per second, measured under operating conditions, say at an average temperature of about 2400° F., or a velocity of about 400 to 1100 feet per minute calculated for standard conditions, 60° F. and 30 inches of mercury. Particularly desirable results have been attained at velocities about 60 to 90 feet per second, based on an average temperature of 2400° F., or about 650 to 1000 feet per minute at standard conditions. The lower velocities have been found satisfactory only in chambers of relatively small cross-section, say not over 14 inches in diameter.

It has been found that the optimum velocity of the mixture passing through the reaction chamber is somewhat influenced by the transverse sectional area of the chamber, and that where smaller units are employed lower velocities may, with the advantage, be used than would be desirable in larger units. For example, in a cylindrical reaction chamber of 9 inches in diameter, a velocity of 33 feet per second has been used with advantage while in commercial sized units velocities above 50 feet per second have been found generally desirable.

The period of time over which violent turbulence is maintained is subject to variation. Under usual operating conditions, the high velocity section of the apparatus should be at least 5 feet in length, following the injection of the make gas, and preferably not less than 7 feet. High velocity sections up to 15 to 20 feet have been used with advantage. The length of the high velocity section of the furnace is, to a considerable extent, dependent upon the velocity at which the gases pass through the chamber and should be such as to afford the necessary time factor under the turbulent conditions. The time factor is also dependent upon the temperature of the gases.

As previously noted, the velocity and turbulence of the mixture leaving the initial stage of the operation may be substantially reduced, though such reduction is not essential. It is usually desirable, however, that the mixture be maintained for a somewhat longer period at a moderately high decomposing temperature in order that the product may have the desired characteristics.

The formation of the colloidal carbon in the initial highly turbulent stage of the operation, will normally have proceeded to the desired extent in about one-fifth second. The duration of the subsequent stage of the process may be varied but normally the desired results are obtained in from about one-fifth to about one second. The over-all reaction time-factor, herein designated "contact time," is with advantage within the range of about one-half to about one second. This contact time factor is measured from the injection of the make gas into the flame gases to the quenching of the hot mixture as by water spray.

In the operation, where an excess of oxygen is used in the combustible mixture, the excess oxygen tends to react with hydrogen liberated by the decomposition of the make gas and also materially influences the surface characteristics and other properties of the carbon black formed. Further, by using an oxidizing blast flame, moderate temperatures may be employed in the initial stage of the reaction, and such moderate temperature maintained during later stages of the reaction by subsequent reactions involving the excess oxygen. During the formation of the carbon, large volumes of hydrogen are liberated and this, due to its high rate of reaction, selectively combines with the excess oxygen to provide additional heat to offset losses due to the endothermic reactions. By the use of 25% to 50% excess oxygen in the combustible mixture, a temperature drop within the elongated and blending chambers of less than 300° F. from the maximum temperature, may be attained. The substantially uniform, moderate reaction temperatures appear to influence substantially the character of the carbon black product.

It has been found desirable in the operation of the present invention to avoid the use of temperatures much in excess of about 2900° F. However, it is essential that the temperature employed be sufficiently high to effect active and substantially complete decomposition of the make gas employed. Temperatures lower than about 1900° F. are not generally desirable. Usually operating temperatures should be within the range of from about 2100° F. to about 2600° F.

A gradual reduction in temperature during the latter portion of the contact time period is not usually objectionable and frequently appears desirable. Such gradual reduction in temperature may be effected in the substantially uninsulated flume prior to contact with the water spray.

The drawings represent a commercial sized apparatus, in which each of the three reaction chambers is about 14 feet 3 inches in length, measured from the extreme front end of the chamber to the point where the enlargement of the chamber begins, and are 17 inches wide and 3 feet 2½ inches high. From the front end of the central reaction chamber to the entrance of the flume is approximately 22 feet 8 inches and the length of the straight, vertical outside walls of the unit is approximately 17 feet 9 inches. The height of the blending chamber is 3 feet 11½ inches. The flume is 3 feet 6 inches inside diameter and about 25 feet long. Each burner block is provided with 8 make gas injection tubes of 1 inch inside diameter and 42 burner ports, the throat of each being 1⅝ inches in diameter.

A greater or lesser number of make gas injection tubes and of burner ports may be used, so long as the make gas tubes are flanked on all sides by blast flames. By this arrangement of the make gas injection tubes each separate stream of make gas in initially treated individually and does not mingle with adjacent streams of gas until the reaction has proceeded to the desired degree.

The dimensions and relative proportions of the various elements of the apparatus are subject to considerable variation but should be of such relative proportions as to provide the herein specified operating conditions.

For example, a second apparatus which has been successfully used in the carrying out of the present invention, comprised a single cylindrical reaction chamber having an inside diameter of 9 inches and constructed of two 4½ inch layers of fire brick, and two 4½ inch layers of insulating brick. The total length of the unit, measured from the entrance end of the reaction chamber to the water spray cooler was 24 feet. The burner block was circular and was provided with eight blast ports of 1 inch diameter throats. A single 1 inch inside diameter Carbofrax make gas injection tube passed through the center of the burner block terminating at a point slightly beyond the face thereof.

Satisfactory results have also been obtained in furnaces comprising a single rectangular reaction chamber 11 inches wide, 24 inches high, and varying from 16 to 24 feet in length. In this unit the burner employed had 13 burner ports, each 1⅝ inches in diameter, and the make gas was introduced through two 1 inch I. D. tubes spaced 10 inches apart.

In general, the cross-sectional area and length of the reaction chamber should bear such relationship to operating capacity, i. e., volume of gaseous mixture passing therethrough, that the specified temperature, high velocity and high degree of turbulence is maintained for a period of time within the specified range. Likewise, the summation of the area of the burner ports and of the make gas injection tubes should bear such relationship to the transverse sectional area of the reaction chamber, as will permit the injection of the respective gases in such volumes, at the required proportions and respective velocities as will establish the prescribed velocities and turbulence conditions in the reaction chamber. Blast ports having diameters as small as ½ inch may be used.

As previously noted the period of violent turbulence need not extend through the entire period during which the mixture is maintained at the elevated temperature required for reaction. The character of the product is materially influenced by the duration of the period of contact with the high temperature gases and the termination of the period is, with advantage, effected by suddenly cooling the mixture, as by means of a water spray, as previously described, to about 1800° F. or lower. Thereafter, the temperature may be dropped to about 500° F. and the carbon black collected in any conventional manner.

The optimum contact time will vary to a noticeable extent with the richness of the fuel and make gas, the proportion of air to total gas used, and the nature of the product desired. The contact time herein referred to is the period of time between injection of the make gas into the blast flame gases and the cooling of the resultant gases and suspended carbon to about 1800° F., as by subjection to a water cooling stage.

In general, if the contact time is too greatly prolonged, a reduction in the reinforcing properties of the resultant carbon black has been observed. Where too short a contact time is permitted, lower yields are obtained and the product will tend to have lower modulus and a higher extractable content. Too short a contact time requires the use of excessively high temperatures to produce carbon black of comparable properties. In general, contact times of about one-half to about one second may be used with advantage.

The inside diameter of the make gas injection tubes may vary from about one-half to about two inches. Usually tubes of about 1 inch inside diameter are most advantageous.

The character of the product has also been found to vary somewhat with the ratio of the air used to the total of the fuel gas and the make gas used. Satisfactory results have been obtained by maintaining this ratio within a range of about 4.6:1 to about 6:1. In general, optimum results have been obtained where the amount of air used is within the range of about 45% to 65% of that which should be required for the complete combustion of both the fuel gas and the make gas.

The process of the present invention will be illustrated by the following specific operations carried out in an apparatus substantially identical with that shown in the drawings except that in these operations only the two outside reaction chambers were used. In each operation, the fuel gas was natural gas of a B. t. u. value of about 1185 per cubic foot.

*Example I*

In this operation, air was supplied to each burner head at the rate of 170,000 cubic feet per hour. The ratio of air to fuel gas was 13.5:1, and the ratio of air to total gas, i. e., fuel gas plus make gas, including oil vapor, was 5.3:1, it being assumed that each gallon of oil is the equivalent of 18.2 cubic feet of oil vapor, corrected to conditions of 60° F. and 30 inches of mercury, at which the gas volumes were calculated. The make gas was natural gas enriched by the addition of hydrocarbon oil of the type of No. 1 Diesel oil thereto in an amount equivalent to 4.1 gallons per 1000 cubic feet of natural gas to raise the B. t. u. value of the mixture to 1650 B. t. u. per cubic foot.

Prior to delivery to the burner head unit, the make gas was preheated to a temperature of 550° F. The make gas injection tubes extended about 7 inches beyond the face of the burner block. The burner throat velocity of the combustible mixture was 84 feet per second, and the injection velocity of the make gas was 123 feet per second, each determined for 60° F. and 30 inches of mercury. The velocity of gases passing through the reaction chambers, as determined for the average chamber temperature, was 78 feet per second. The contact time was approximately ¾ second. The temperature of the gaseous mixture at a point 9 inches down stream from the face of the burner block was recorded as 2510° F. and at a point 2 feet further down stream, the temperature was recorded as 2520° F. The temperature of the gaseous mixture and suspended carbon at a point 12¼ feet down stream from the burner block face was 2330° F., and the temperature 2½ feet beyond the entrance to the flume was 2100° F.

The yield was equivalent to 13.6 pounds per 1000 cubic feet of total gas, including vaporized oil. The product was found to have a pH value of 8.9, to contain 0.15% benzene extractable, to have an oil absorption value of 11.6 gallons per 100 pounds of carbon, and a tinctorial strength of 77.3% that of standard rubber grade impingment carbon black. The mean particle diameter of the carbon, as determined by the electron microscope method, was 57 millimicrons, and its surface area was 5.4 acres per pound. The color value of the carbon was 96.

*Example II*

In this operation air was supplied to each burner head at the rate of 170,000 cubic feet per hour. The ratio of air to fuel gas was 15:1, and the ratio of air to total gas, i. e., fuel gas plus make gas, including oil vapor was 5.35:1, each calculated as in Example I. The make gas was natural gas enriched by the addition of hydrocarbon oil of the type of No. 3 bunker oil, thereto in an amount equivalent to 3.5 gallons per 1000 cubic feet of natural gas, to raise the B. t. u. value of the mixture to 1600 B. t. u. per cubic foot.

Prior to delivery to the burner head unit, the make gas was preheated to a temperature of 480° F. The exit ends of the make gas injection tubes were flushed with the face of the burner block. The burner throat velocity of the combustible mixture was about 83 feet per second and the injection velocity of the make gas was about 130 feet per second, each determined for 60° F. and 30 inches of mercury. The velocity of gases passing through the reaction chamber, as determined for the average chamber temperature, was about 78 feet per second and the contact time was approximately ¾ second. The temperature of the gaseous mixture at a point 9 inches down stream from the face of the burner block was recorded as 2440° F. The temperature of the gaseous mixture and suspended carbon at a point 12¼ feet down stream from the burner block face was 2440° F., and the temperature 2½ feet beyond the entrance to the flume was 2240° F.

The yield was equivalent to 10.6 pounds per 1000 cubic feet of total gas, including vaporized oil. The product was found to have a pH value of 8.8, to contain 0.1% benzene extractable and to have an oil absorption value of 11.1 gallons per 100 pounds of carbon.

*Example III*

In this operation air was supplied to each burner head at the rate of 170,000 cubic feet per hour. The ratio of the air to fuel gas was 14:1, and the ratio of air to total gas, i. e., fuel gas, plus make gas was 4.9:1, each calculated as in Example I. The make gas was natural gas unenriched having a B. t. u. value of 1185 B. t. u. per cubic foot. The make gas was delivered to the burner head unit at a temperature of about 60° F. The exit end of the make gas injection tubes was flush with the face of the burner block. The burner throat velocity of the combustible mixture was about 84 feet per second, and the injection velocity of the make gas was about 144 feet per second, each determined for 60° F. and 30 inches of mercury. The velocity of the gases passing through the reaction chamber, as determined for the average chamber temperature, was about 78 feet per second. The contact time was approximately ¾ second. The temperature of the gaseous mixture at a point 9 inches down stream from the face of the burner block was recorded as 2510° F., and at a point 2 feet further down stream, the temperature was recorded as 2530° F. The temperature of the gaseous mixture and suspended carbon, at a point 12¼ feet down stream from the burner block face, was 2480° F. and the temperature 2½ feet beyond the entrance to the flume, was 2350° F.

The yield was 3.5 pounds of carbon black per 1000 cubic feet of total gas. The product was found to have a pH value of about 9–10, to contain less than 0.05% benzene extractable and to have an oil absorption value of 8.6 gallons per 100 pounds of carbon.

*Example IV*

This run was made on the apparatus comprising a single 20 foot rectangular reaction chamber previously described herein. In this operation air was supplied to the burner at the rate of 43,400 cubic feet per hour. The B. t. u. value of the fuel gas was 960 B. t. u. per cubic foot. The ratio of air to fuel gas was 13.9:1 and the ratio of air to total gas, i. e., fuel gas plus make gas, including oil vapor was 5.55:1, each calculated as in Example I. The make gas was natural gas enriched by the addition of hydrocarbon oil of the type of Diesel oil thereto, in an amount equivalent to 4.67 gallons per 1000 cubic feet of natural gas to raise the B. t. u. value of the mixture to 1510 B. t. u. per cubic foot.

Prior to the delivery to the burner head the make gas was preheated to a temperature of 500° F. The make gas injection tubes extended about 1 inch beyond the face of the burner block. The burner throat velocity of the combustible mixture was 69 feet per second and the injection velocity of the make gas was 120 feet per second, each determined for 60° F. and 30 inches of mercury. The velocity of gases passing through the reaction chamber, as determined for the average chamber temperature, was 46 feet per second. The contact time was approximately ½ second. The temperature of the gaseous mixture at a point 27 inches down stream from the face of the burner block was recorded as 2510° F., and at a point 17½ feet down stream from the burner block face, was recorded as 2305° F.

The yield was equivalent to 9.23 pounds of carbon black per 1000 cubic feet of total gas, including vaporized oil. The product was found to have a pH value of 9.7, to contain 0.11% benzene extractable, to have an oil absorption value of 11 gallons per 100 pounds of carbon, and a tinctorial strength of 72% of that of rubber grade impingement carbon black. The mean particle diameter, as determined by the electron microscope method, was 55 millimicrons and the surface area of the carbon was 5.3 acres per pound. The color value of the product was 95.

In the foregoing examples, the method used for determining color was that described in the article by C. W. Sweitzer and W. C. Goodrich entitled "The carbon spectrum for the rubber compounder" appearing in "The Rubber Age," volume 55, No. 5, page 469, August, 1944.

A partial pyrolysis of the make gas prior to intimate dispersion of the make gas in the blast flame gases appears to have a tendency to impart higher modulus characteristics to the carbon black product. As previously noted, such preliminary partial pyrolysis of the make gas may be obtained in accordance with our present invention by reason of the method of injecting the make gas into the blast flame gases. The amount of such pyrolysis prior to dispersion of the make gas in the blast flame gases may be increased in accordance with our present invention by increasing the amount of protrusion of the make gas injection tubes and, consequently, the amount of preheating of the make gases. The optimum amount of protrusion of the make gas injection tubes will depend primarily upon the particular characteristics of the carbon black desired, the size of the unit, the relative size of the make gas injection tubes with respect to the size of the unit, the composition of the make gas, the blast temperature, and the velocity at which the make gas is passed through the injection tubes. The latter factor influences the rate at which the make gas stream becomes intimately admixed with the turbulent blast flame gases and, consequently, the extent of preliminary pyrolysis after injection.

The temperatures set forth in the foregoing Example IV were determined by means of a Leeds and Northrup optical pyrometer sighted on Carbofrax target tubes. In Examples I to III, the temperatures were measured by means of a Leeds and Northrup Micromax recording potentiometric pyrometer connected to a Leeds and Northrup Rayotube which was focused on a 2 inch I. D. Carbofrax target tube.

We claim:

1. A process for the production of carbon black which comprises blasting a combustible mixture of a fuel gas and an oxygen-containing gas into one end of an elongated, unobstructed, heat-insulated chamber of substantially uniform cross-section, as a plurality of streams uniformly spaced over the cross-sectional area of the chamber, burning the combustible mixture in said chamber to form a high velocity, highly turbulent blast flame, separately and forcefully injecting a stream of hydrocarbon make gas into the resultant blast flame, adjacent the said end of the chamber, in a direction concurrent with, and substantially parallel to, the direction of flow of the blast flame through the chamber and so as to avoid contact between the make gas and the walls of the chamber until it has been intimately mixed with the blast flame gases, the total amount of make gas and fuel gas substantially exceeding that required to consume the oxygen present in the combustible mixture, continuing the flow of the resultant mixture through the chamber in a highly turbulent state and at a temperature sufficiently high to decompose the hydrocarbon constituents thereof to form carbon particles in suspension and thereafter cooling the resultant suspension and collecting the carbon.

2. The process of claim 1 in which the amount of oxygen present in the combustible mixture is substantially in excess of that required for combustion of the fuel gas.

3. The process of claim 1 in which the make gas is injected into the blast flame gases at a velocity in excess of the velocity of flow of the blast flame gases through the chamber.

4. The process of claim 1 in which the make gas contains a substantial amount of hydrocarbons having in excess of one carbon atom per molecule.

5. A process for the production of carbon black which comprises blasting a combustible mixture of a fuel gas and an oxygen-containing gas into one end of an elongated, unobstructed, heat-insulated chamber of substantially uniform cross-section, as a plurality of streams, uniformly spaced over the cross-sectional area of the chamber, burning the combustible mixture in said chamber to form a high velocity, highly turbulent stream of blast flame gases, separately and forcefully injecting a plurality of streams of hydrocarbon make gas into the resultant blast flame gases, adjacent the said end of the chamber, in a direction concurrent with and substantially parallel to the direction of flow of the blast flame gases through the chamber, the respective streams of make gas injected into the chamber being uniformly positioned between and flanked on all sides by the entering streams of combustible mixture so that contact between the make gas and the walls of the chamber is avoided until the make gas has been intimately mixed with the blast flame gases, the total amount of make gas and fuel gas substantially exceeding that required to consume the oxygen present in the combustible mixture, continuing the flow of the resultant mixture through the chamber in a highly turbulent state and at a temperature sufficiently high to decompose the hydrocarbon constituents thereof to form carbon particles in suspension and thereafter cooling the resultant suspension and collecting the carbon.

6. The process of claim 5 in which the make gas used is composed of natural gas enriched by mixing therewith hydrocarbons containing more than one carbon atom per molecule to 1,150 to 2,000 B. t. u. per cubic foot, the amount of oxygen present in the combined mixture is in excess of that required for combustion of the fuel gas, the combustible mixture is injected into the chamber at a velocity of 35 to 135 feet per second and the make gas is injected into the blast flame gases at a velocity in excess of the velocity of flow of the flame gases through the chamber, the temperature of the flame gases at the point of injection of the make gas being within the range of 2,100° to 2,600° F. and the ratio of air to fuel gas plus make gas being within the range of 4.5:1 to 6.5:1.

WILLIAM B. WIEGAND.
HAROLD A. BRAENDLE.

REFERENCES CITED

The following references are of record in the file of this patent:

UNITED STATES PATENTS

| Number | Name | Date |
|---|---|---|
| 1,669,618 | Lewis | May 15, 1928 |
| 1,909,163 | Brownlee | May 16, 1933 |
| 1,925,131 | Brownlee | Sept. 5, 1933 |
| 2,039,981 | Rembert | May 5, 1936 |
| 2,163,630 | Reed | June 27, 1939 |
| 2,238,576 | Heller et al. | Apr. 15, 1941 |
| 2,368,828 | Hanson et al. | Feb. 6, 1945 |
| 2,375,797 | Krejci | May 15, 1945 |
| 2,378,055 | Wiegand et al. | June 12, 1945 |